UNITED STATES PATENT OFFICE.

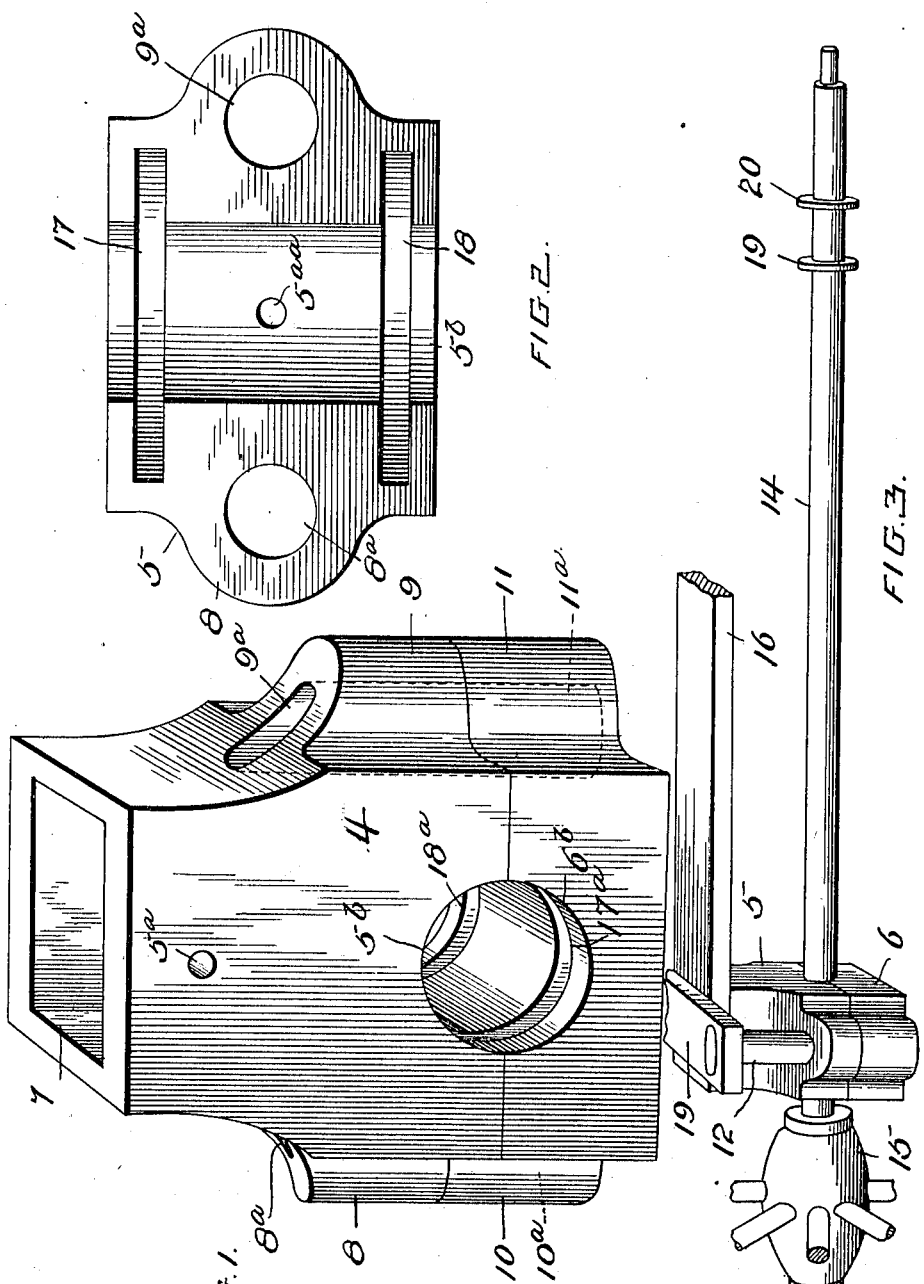

FRIEDRICH STRECKER, OF SALT LAKE CITY, UTAH.

WAGON RUNNING-GEAR.

1,035,106. Specification of Letters Patent. Patented Aug. 6, 1912.

Application filed February 10, 1912. Serial No. 676,698.

*To all whom it may concern:*

Be it known that I, FRIEDRICH STRECKER, who have filed my declaration of intention to become a citizen of the United States, and a resident of Salt Lake City, in the county of Salt Lake and State of Utah, have invented new and useful Improvements in Wagon Running-Gears, of which the following is a specification.

My invention has relation more specifically to the axle and wheel of a running gear together with the journal box, in which the axle is mounted to turn.

The invention contemplates an improvement over prior arrangements in that it eliminates, in part or wholly, the mounting of the wheels rotatably upon axles together with the well known disadvantages inherent in this old arrangement. One of such disadvantages is the excessive wearing of the co-acting bearing surfaces of the axle and wheel-nave or hub due to the slip of the wheel longitudinally of the axle.

An object of my invention is to eliminate the wear by replacing the wheel rotatably mounted upon a non-rotatable axle with a wheel non-rotatable upon the axle, the axle itself being mounted to turn in a journal box. The axle is formed with flanges which rest in recesses in the journal box and thus the axle is effectually prevented from sliding lengthwise in the bearing.

Another object is to provide a journal box so formed as to provide a dust tight automatic lubricator thus eliminating the frequent removal of the wheel to lubricate the axle, and with its parts so connected as to permit of adjustability to compensate for wear.

The results of these constructions are that "wabbly" wheels, if not entirely eliminated, occur much later in the life of the wagon; the wheels are maintained perpendicular and in consequence side strains and blows upon the rim are lessened whereby the liability to loose spokes is also lessened; and an efficient lubricating system is provided.

Many other advantages will occur to one familiar with the art to which this invention relates.

Proceeding now to a detailed description of the invention I make reference to the accompanying drawings in which:—

Figure I. is a perspective view of the journal box, Fig. II. is a bottom plan view of the upper part of the box, and Fig. III. is a perspective view of the axle, wheel and journal box a part of the supporting frame for the wagon box also being shown.

In the drawings like reference characters refer to the same parts throughout the several views.

The journal box 4 is composed broadly of the upper section 5 and the lower section 6. Section 5 is cast hollow as indicated at 7 and is of the form shown. It is provided with wings 8 and 9 provided with bolt receiving bores $8^a$ and $9^a$. The upper part, is also formed with the grease port $5^a$ leading to the receptacle $7^a$, with a semi-cylindrical bearing $5^b$, and with recesses 17, 18 whose purpose will be explained as this description proceeds. The passage $5^{aa}$ (Fig. II) provides communication between the receptacle 7 and the bearing $5^b$. The lower part 6 is provided with parts $6^b$, 10, 11, $10^a$, $11^a$, $17^a$, $18^a$ corresponding respectively with parts $5^b$, 8, 9, $8^a$, $9^a$, 17 and 18 of the upper part. Bolts 12 and 13 received in the bolt-receiving bores serve to maintain the upper and the lower part in operative relation and permit relative adjustment of the parts.

It will be seen that when assembled the parts 5 and 6 provide a cylindrical bearing $5^b$, $6^b$, and that annular recesses 17, $17^a$, and 18, $18^a$, are also provided as shown.

The axle 14 carries flanges 19 and 20 which are adapted to be received in the recesses 17, $17^a$ and 18, $18^a$ respectively.

The open top of the journal box may be closed by a part 16 of the wagon frame which may be held in place by the cross piece 19 connected with bolts 12, 13 as shown.

The wheel 15 is mounted fast upon axle 14, the wheel (not shown) at the opposite end of the axle being loose thereon to permit of the wheel traveling at different rim speed when rounding curves. It is evident however, that ordinarily there will be no relative motion between the axle and the bearing of the loose wheel as the loose wheel rotates at the same speed as the fast wheel and the fast wheel and axle rotate together. The flanges 19, 20, evidently prevent slipping of the axle longitudinally and thus the running gear of the wagon is maintained staunch and rigid.

If a preferred type and consistency of lubricant is used it is evident that the rotation of the axle will drain the lubricant from receptacle 7 through passage $5^{aa}$ and thus an automatic means of lubrication is provided thus eliminating the necessity of removing the wheel to lubricate the axle which necessity existed in prior devices. The port 5ª is closed dust tight by any suitable means.

Having now fully described my invention and set forth the advantages, I claim it as follows, it being understood that I do not limit myself to the precise form and construction shown and described but contemplate various changes in the details and the substitution of proper equivalents:—

A wagon running gear, comprising a rotatable axle shaft, a wheel rigidly secured upon one end thereof and a wheel rotatably mounted upon the opposite end, bearing surfaces and a plurality of pairs of annular flanges adjacent thereto on said axle intermediate its ends, two-part journal boxes for said shaft the parts of which are adjustable with respect to each other, and respectively provided with coacting semi-cylindrical bearing surfaces which are interrupted by a plurality of semi-annular corresponding recesses concentric with said bearing surfaces and extending into the body of said box at right angles to said surface; the annular flanges of said axle being adapted when the parts are assembled to be received each in a corresponding pair of said semi-annular recesses whereby longitudinal movement of said bearings is prevented, means for securing said journal boxes upon a wagon frame and adjusting the parts thereof relatively to control the effectiveness of the connection between the flanges and the semi-annular recesses.

FRIEDRICH STRECKER.

Witnesses:
C. R. EPPERSON,
CHAS. W. KING.

Copies of this patent may be obtained for five cents each, by addressing the "Commissioner of Patents, Washington, D. C."